US009262407B1

(12) United States Patent
Ermann et al.

(10) Patent No.: US 9,262,407 B1
(45) Date of Patent: Feb. 16, 2016

(54) OPTIMIZATION OF A MULTI-LANGUAGE USER INTERFACE LAYOUT VIA REVERSE PSEUDO-TRANSLATION

(71) Applicant: International Business Machines Corporation, Armonk, NY (US)

(72) Inventors: Renato Ermann, Gahanna, OH (US); Yan Min Sheng, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/491,150

(22) Filed: Sep. 19, 2014

(51) Int. Cl.
*G06F 9/45* (2006.01)
*G06F 17/28* (2006.01)
*G06F 17/21* (2006.01)
*G06F 3/0482* (2013.01)
*G06F 3/0484* (2013.01)

(52) U.S. Cl.
CPC .............. *G06F 17/28* (2013.01); *G06F 3/0482* (2013.01); *G06F 3/04842* (2013.01); *G06F 17/212* (2013.01); *G06F 17/218* (2013.01)

(58) Field of Classification Search
USPC .......................................... 717/136; 715/249
See application file for complete search history.

(56) References Cited

U.S. PATENT DOCUMENTS

| | | | |
|---|---|---|---|
| 6,694,310 B1 * | 2/2004 | Yu et al. ...................... 707/718 | |
| 7,698,126 B2 | 4/2010 | Kohlmeier et al. | |
| 8,392,872 B2 | 3/2013 | Bak et al. | |
| 8,990,672 B1 * | 3/2015 | Grosz ................... G06F 17/212 | 715/202 |
| 2002/0091510 A1 * | 7/2002 | Forrest et al. ..................... 704/8 | |
| 2003/0037178 A1 * | 2/2003 | Vessey et al. ................ 709/319 | |
| 2005/0193377 A1 * | 9/2005 | Seto et al. ...................... 717/136 | |
| 2006/0026505 A1 * | 2/2006 | Mani ..................... G06F 17/227 | 715/234 |
| 2006/0106593 A1 * | 5/2006 | Schultz et al. ..................... 704/5 | |
| 2007/0169013 A1 * | 7/2007 | Bak et al. ....................... 717/136 | |
| 2009/0086965 A1 * | 4/2009 | Glendinning ................... 380/44 | |
| 2010/0034385 A1 * | 2/2010 | Gantman et al. .............. 380/268 | |
| 2011/0156896 A1 * | 6/2011 | Hoffberg ................ G05B 15/02 | 340/506 |
| 2012/0278344 A1 | 11/2012 | Berg et al. | |
| 2012/0311295 A1 | 12/2012 | Gaur et al. | |
| 2013/0138421 A1 * | 5/2013 | Moulder ........................... 704/3 | |
| 2013/0226555 A1 * | 8/2013 | Lerum et al. ...................... 704/2 | |
| 2014/0089827 A1 * | 3/2014 | Gu et al. ........................ 715/765 | |
| 2014/0108562 A1 * | 4/2014 | Panzer .......................... 709/206 | |

FOREIGN PATENT DOCUMENTS

EP         1857928 A1     11/2007

\* cited by examiner

*Primary Examiner* — Chameli Das
(74) *Attorney, Agent, or Firm* — Michael O'Keefe; Jeanine Ray

(57) ABSTRACT

A method for optimizing a multi-language user interface layout across languages via reverse pseudo-translation using an integrated development environment is provided. The method may include selecting at least one user interface page from a group of user interface pages in a first language for pseudo-translation. The method may include selecting at least one target language from a group of target languages in which to pseudo-translate the at least one user interface page. The method may include specifying at least one layout requirement for formatting the selected user interface pages. The method may include performing pseudo-translation of the at least one user interface page. The method may include modifying, automatically, the at least one pseudo-translated user interface page through application of a merge algorithm according to the at least one specified layout requirement. The method may include implementing a reverse pseudo-translation of the at least one modified pseudo-translated user interface page.

17 Claims, 4 Drawing Sheets

300

302 First language user interface layout page:
```
<p style="white-space: nowrap;overflow: hidden">
<button style="width:10%;white-space: nowrap;overflow: hidden">I Accept It</button>
some longer text should be displayed here as it shows only part of text here this is not correct and should be fixed before the product is released.
</p>
```
which will be shown as:

[ I Accept It ]   some longer text should be displayed here as it shows only part of text here this is not correct and should be fixed before the product is released.

304 Pseudo-translated user interface layout page:
```
<p style="white-space: nowrap;overflow: hidden">
<button style="width:10%;white-space: nowrap;overflow: hidden">[ Accept It~~~~~~~~de]</button>
[some longer text should be displayed here as it shows only part of text here this is not correct and should be fixed before the product is released.~~~~~~~~~de]
</p>
```
which will be shown as:

306 [ I Accept It~~~~~~~d ]   [some longer text should be displayed here as it shows only part of text here this is not correct and should be fixed before the product is released.

308 Modified pseudo-translated user interface layout page:
```
<p>
<button style="width:15%;white-space: nowrap;overflow: hidden">[ Accept It~~~~~~~~de]</button>
[some longer text should be displayed here as it shows only part of text here this is not correct and should be fixed before the product is released.~~~~~~~~~de]
</p>
```
which will be shown as:

310 [ I Accept It~~~~~dc ]   [some longer text should be displayed here as it shows only part of text here this is not correct and should be fixed before the product is released.~~~~~~~~~de

312 Modified first language user interface layout page:
```
<p>
<button style="width:15%;white-space: nowrap;overflow: hidden">I Accept It</button>
some longer text should be displayed here as it shows only part of text here this is not correct and should be fixed before the product is released.
</p>
```
which will be shown as:

314 [ I Accept It ]   some longer text should be displayed here as it shows only part of text here this is not correct and should be fixed before the pr

OPTIMIZATION OF A MULTI-LANGUAGE USER INTERFACE LAYOUT VIA REVERSE PSEUDO-TRANSLATION

BACKGROUND

The present invention generally relates to the field of computing, and more particularly to language translation and layout optimization.

Computer programs may present information to a user in different languages. Upon installation of a program, the user may designate, from a list, the language in which the computer program may present information. For example, the user may be presented with a drop down menu listing the English language, the French language, the German Language, and the Spanish language. Therefore, the program developer may design the computer program user interface layout to properly accommodate translation into each of the presented languages.

SUMMARY

According to one embodiment, a method for optimizing a multi-language user interface layout via reverse pseudo-translation using an integrated development environment is provided. The method may include selecting at least one user interface page from a group of user interface pages in a first language for pseudo-translation into at least one target language. The method may include selecting at least one target language from a group of target languages in which to pseudo-translate the at least one user interface page. The method may include specifying at least one layout requirement for formatting the selected user interface pages. The method may include performing pseudo-translation of the at least one user interface page. Additionally, the method may include modifying, automatically, the at least one pseudo-translated user interface page through application of a merge algorithm according to the at least one specified layout requirement. The method may include implementing a reverse pseudo-translation of the at least one modified pseudo-translated user interface page.

According to another embodiment, a computer system for optimizing a multi-language user interface via reverse pseudo-translation using an integrated development environment is provided. The computer system may include one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method. The method may include selecting at least one user interface page from a group of user interface pages in a first language for pseudo-translation into at least one target language. The method may also include selecting at least one target language from a group of target languages in which to pseudo-translate the at least one user interface page. The method may further include specifying at least one layout requirement for formatting the selected user interface pages. The method may include performing pseudo-translation of the at least one user interface page. Additionally, the method may include modifying, automatically, the at least one pseudo-translated user interface page through application of a merge algorithm according to the at least one specified layout requirement. The method may also include implementing a reverse pseudo-translation of the at least one modified pseudo-translated user interface page.

According to yet another embodiment, a computer program product for optimizing a multi-language user interface via reverse pseudo-translation using an integrated development environment is provided. The computer program product may include one or more computer-readable tangible storage medium and program instructions stored on at least one of the one or more tangible storage medium, the program instructions executable by a processor. The computer program product may include program instructions to select at least one user interface page from a group of user interface pages in a first language for pseudo-translation into at least one target language. The computer program product may also include program instructions to select at least one target language from a group of target languages in which to pseudo-translate the at least one user interface page. The computer program product may further include program instructions to specify at least one layout property for formatting the selected user interface pages. The computer program product may include program instructions to perform pseudo-translation of the at least one user interface page. Additionally, the computer program product may include program instructions to modify, automatically, the at least one pseudo-translated user interface page through application of a merge algorithm according to the at least one specified layout requirement. The computer program product may also include program instructions to implement a reverse pseudo-translation of the at least one modified pseudo-translated user interface page.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 3 is an example of a Multi-Language User Interface Layout Optimizing Program according to at least one embodiment;

DETAILED DESCRIPTION

Figure 1:
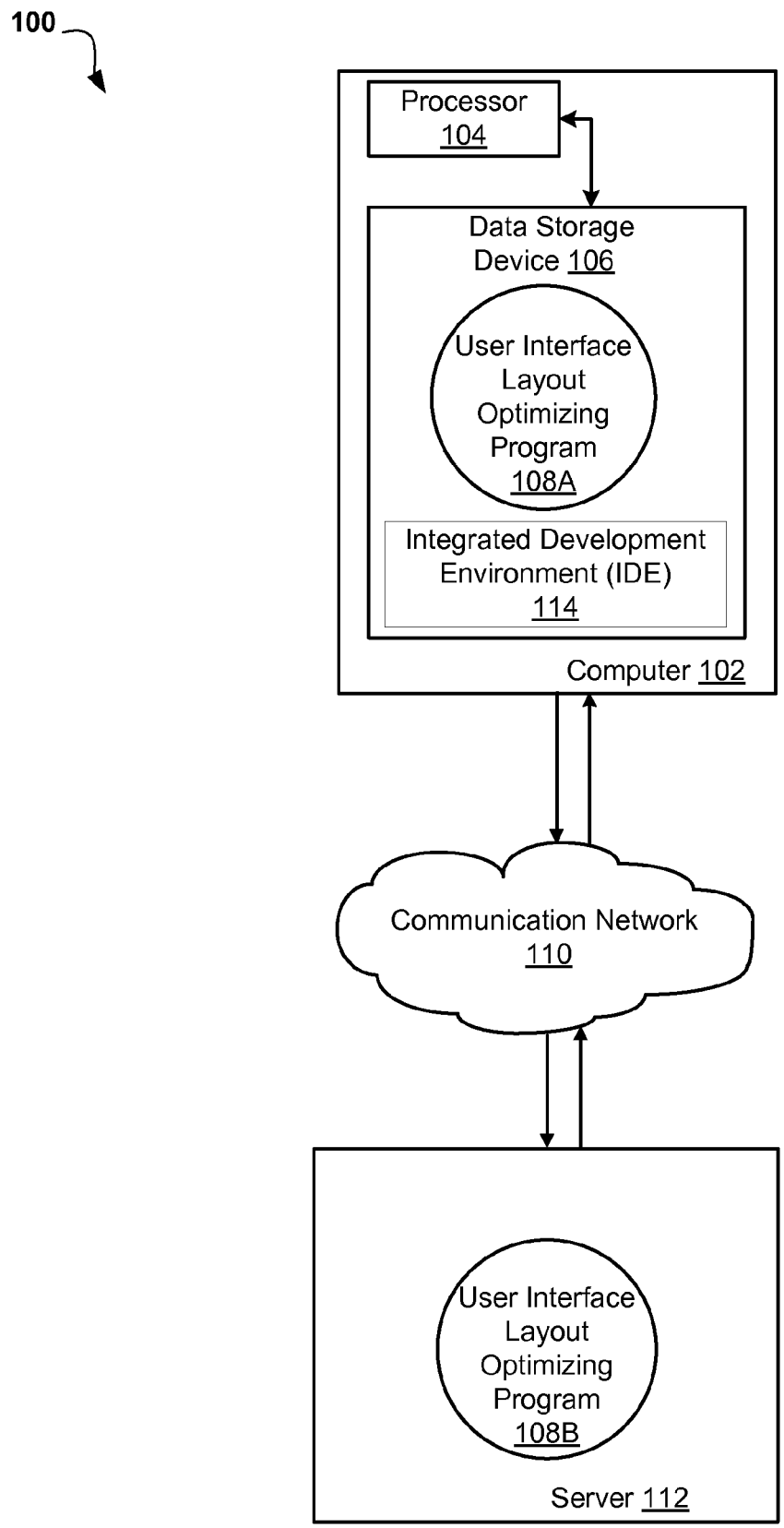
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate to the field of computing, and more particularly to language translation and layout optimization. The following described exemplary embodiments provide a system, method, and program product to, among other things, optimize a multi-language user interface via reverse pseudo-translation.

As previously described, computer programs may implement different languages to present information to the program user (e.g. the consumer of the program). Upon installation of a program, the program user may designate, from a list, the language in which the computer program may present information. However, despite a program presenting information in only one language at a time, a program developer may design the user interface layout to accommodate a number of languages the program is designed to support. When building this multi-language user interface, a developer may ensure that no truncation or other layout issues are introduced as text when translated to the target language. An approach to achieving an optimal layout for all languages that may ease future page enhancements may be to use pseudo-translation to identify translatability problems before actual translation of the pages of text. Pseudo-translation is an automated process in which all strings of text are artificially expanded according to an algorithm to test for errors before performing an actual translation. Pseudo-translation also allows identification of other translatability issues, such as hard-coded strings and phrase concatenation.

After the completion of pseudo-translation, translatability testers manually view each screen of the user interface to verify where the expanded strings of text are not displaying properly. Upon discovering a defect in the pseudo-translated text, developers manually revise the layout in the first language. Developers and translatability testers repeat the pseudo-translation and verification processes, respectively, to ensure display issues no longer exist, and then repeat the process again for each language in which the final program may operate. This iterative, trial-and-error process may require a tremendous amount of manual effort; may become very tedious and time consuming; and may demand a great deal of interaction between the developers and translatability testers. Therefore, it may be advantageous, among other things, to automatically optimize multi-language user interface layouts using reverse pseudo-translation. It may also be desirable to enable support for additional languages after product release without involvement of product developers and without extensive additional product testing.

According to one implementation, the present embodiment may provide a method for developers to optimize the multi-language user interface layout via reverse pseudo-translation, earlier in the development cycle. As such, the present embodiment may enable developers to correct most layout issues before any testing and actual translations are completed. The present embodiment may also allow the issue-identification and format and style adjustment processes to be automated. Therefore, with automation of the issue-identification and format and style adjustment processes, developers may be freed from layout issue-identification and correction during the pseudo-translation process. Furthermore, the present embodiment may only require developers to address any layout issues introduced during actual translation (e.g. font-size or font proportionality differences).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to provide for optimization of a multi-language user interface layout using reverse pseudo-translation. As previously described, pseudo-translation is an automated process in which all strings of text are artificially expanded according to an algorithm to test for errors before performing an actual translation. Conversely, reverse pseudo-translation is an automated process used to return artificially expanded, pseudo-translated strings of text to the first language in which the strings of text were originally presented. The present embodiment may enable layout adjustment to take place earlier in the development cycle. According to at least one implementation of the present embodiment, when developers design a user interface in an integrated development environment (IDE), the developers may be allowed to establish a specified set of layout requirements (e.g. high level language rules) to be applied to a selected group of target languages (e.g. languages the program layout text may be translated into); perform a pseudo-translation of the user interface pages designed and selected by the developers into each of target languages in the group of target languages; and automatically adjust the format and style according to the specified layout requirements to avoid the truncation or layout issues. Additionally, reverse pseudo-translation may then be implemented to restore the original first language user interface page while preserving the modifications made to the in-line format and style.

Furthermore, the present embodiment may be applied to any integrated development environment (IDE) that uses markup layout syntax that contains format or style data embedded with the resources text. For example, such markup layout languages may include cascading style sheets (CSS), HyperText Markup Language (HTML), Extensible Markup Language (XML), and Windows resource definition formats, such as resource-definition script (RC) and resource files (RESX), and Android XML layout definition formats.

Advantages of the present embodiment may include detecting and fixing layout issues earlier in the development cycle and, therefore, potentially lowering development or testing costs. Additionally, according to at least one implementation of the present embodiment, layout issues may be potentially fixed automatically and, as such, may avoid format issues introduced by human error. Furthermore, the present embodiment may eliminate labor intensive manual testing efforts and ease future user interface enhancements by minimizing the extent of layout properties that must be maintained.

Referring now to FIG. 1, an exemplary networked computer environment 100 in accordance with one embodiment is depicted. The networked computer environment 100 may include a computer 102 with a processor 104 and a data storage device 106 that is enabled to run a Multi-Language User Interface Layout Optimizing Program 108A and an integrated development environment (IDE) 114. The networked computer environment 100 may also include a server 112 that is enabled to run a Multi-Language User Interface Layout Optimizing Program 108B and a communication network 110. The networked computer environment 100 may include a plurality of computers 102 and servers 112, only one of which is shown for illustrative brevity. The communication network may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 112 via the communications network 110. The communications network 110 may include connections, such as wire, wireless communication links, or fiber optic cables. As will be discussed with reference to FIG. 4, server computer 112 may include internal components 800a and external components 900a, respectively and client computer 102 may include internal components 800b and external components 900b, respectively. Client computer 102 may be, for example, a mobile device, a telephone, a personal digital assistant, a netbook, a laptop computer, a tablet computer, a desktop computer, or any type of computing device capable of running a program and accessing a network.

According to the present embodiment, a program, such as a Multi-Language User Interface Layout Optimizing Program 108A and 108B may run on the client computer 102 or on the server computer 112. The Multi-Language User Interface Layout Optimizing Program 108A, 108B may optimize multi-language user interface layouts via reverse pseudo-translation. The Multi-Language User Interface Layout Optimizing Program 108A, 108B may operate in conjunction with the IDE 114. An IDE is a software application that provides comprehensive facilities to computer programmers for software development. An IDE normally consists of a source code editor, build automation tools and a debugger. Eclipse, Komodo, and NetBeans are examples of popular IDE applications. The Multi-Language User Interface Layout Optimizing Program 108A, 108B may be operated by a user from a computer 102 on which the Multi-Language User Interface Layout Optimizing Program 108A, 108B is installed or accessed remotely through a server by a local workstation client. The IDE may be invoked through a graphical user interface (GUI) or a command line prompt. The IDE may implement the Multi-Language User Interface Layout Optimizing Program 108A, 108B and may communicate with the Multi-Language User Interface Layout Optimizing Program on the server 112. The Multi-Language User Interface Layout Optimizing method is explained in further detail below with respect to FIG. 2.

Figure 2:
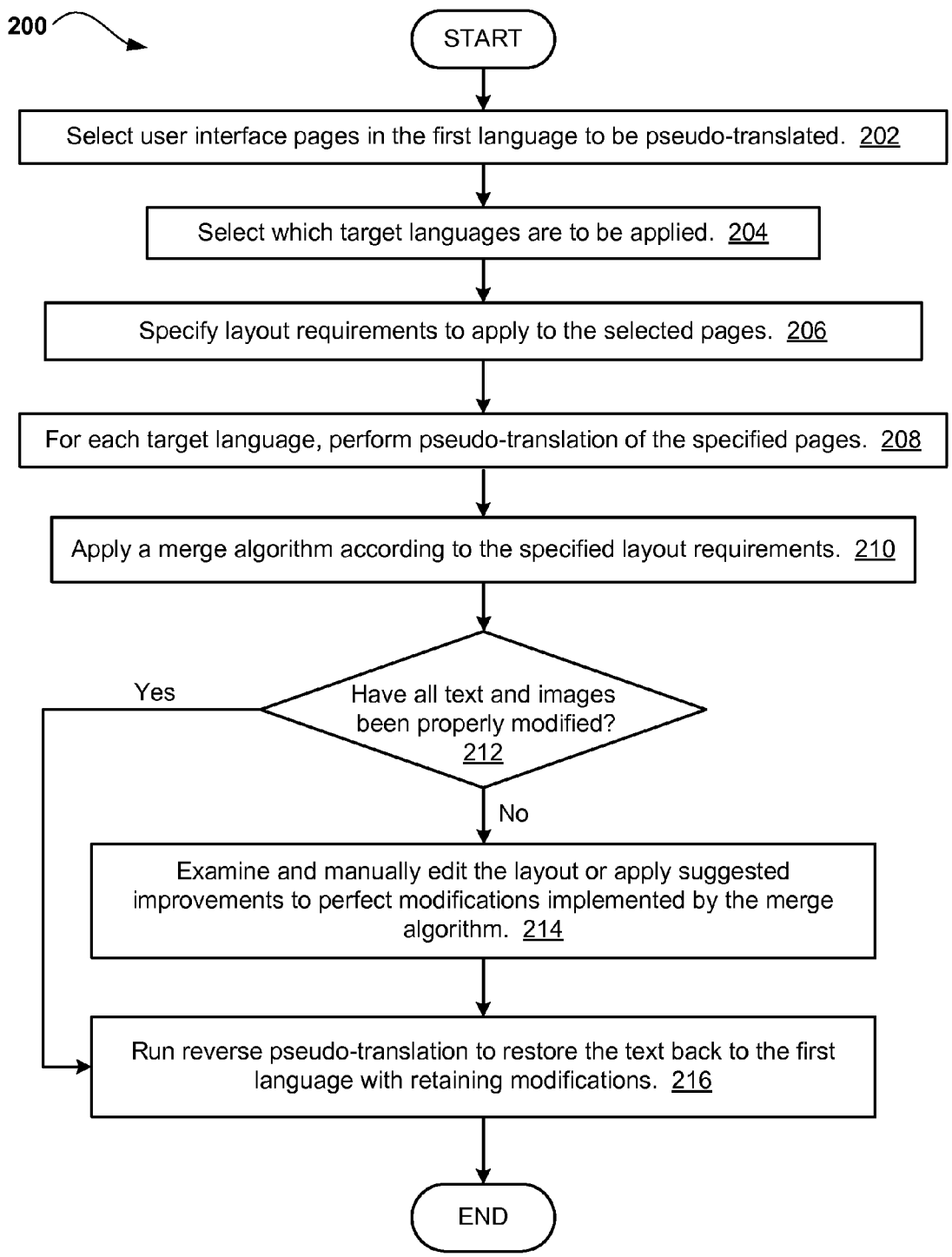
FIG. 2 is an operational flow chart illustrating the steps carried out by a program to optimize a multi-language user interface via reverse pseudo-translation according to at least one embodiment.

FIG. 2, an operational flowchart 200 illustrating the steps carried out by a program to optimize a multi-language user interface layout via reverse pseudo-translation in accordance with the present embodiment is depicted. At 202, the Multi-Language User Interface Layout Optimizing Program 108A, 108B (FIG. 1) may prompt the program developer to select which user interface layout pages (e.g. layout pages) in the first language are to be pseudo-translated. For example, as a program developer operating a computer, such as client computer 102 (FIG. 1), may be working in an IDE to design the layouts for the user interface of a software program, the present embodiment may prompt the user, via a user interface (UI) to select at least one user interface page from the group of user interface layout pages being designed of which the Multi-Language User Interface Layout Optimizing Program 108A, 108B (FIG. 1) may perform a pseudo-translation. According to at least one implementation, the user interface layout pages may be stored in a file on the client computer 102 (FIG. 1).

Next at 204, the Multi-Language User Interface Layout Optimizing Program 108A, 108B (FIG. 1) may prompt the program developer to select which target languages pseudo-translation may be applied. For example, when the first language is English, the program developer may select a group of target languages (e.g. Spanish, French, German) different from the first language that the completed software program may be translated into. Furthermore, selection of the group of target languages may be achieved through a pull-down menu in the IDE, by selecting the languages in a configuration file, or as parameters on a command line. Additionally, the information needed for the present embodiment to perform a pseudo-translation into the selected target languages may be stored in a user configurable file. The user configurable file may contain information relevant to the pseudo-translation into each of the selected target languages, such as an expansion factor for each target language. The expansion factor for each target language is explained in further detail below with respect to step 208. The Multi-Language User Interface Layout Optimizing Program 108A, 108B may use the selected target languages to accurately expand the first language during the pseudo-translation process.

Then at 206, the Multi-Language User Interface Layout Optimizing Program 108A, 108B (FIG. 1) may prompt the program developer to specify layout requirements (e.g. high level language rules) to apply to the selected user interface layout pages. A layout requirement is an element of a language or a particular arrangement of the user interface layout that the program developer wishes the selected user interface pages to possess once the Multi-Language User Interface Layout Optimizing Program 108A, 108B (FIG. 1) has completed operation. Different categories of layout requirements exist. For example, there are layout requirements that are common to all languages (e.g. prevent truncation), layout requirements specific to a group of languages (e.g. Asian languages may disallow text wrap vertically for a word composed of multiple characters), and layout properties specific to a single language (e.g. Korean characters presented in a larger font). Other layout requirements particular to the presentation of the language text and page images may also be specified. For example, a program developer may wish a certain ratio of white space to text space be present or that components, such as radio boxes and list boxes, align with the images they correspond to. As discussed in step 210 below, the present embodiment may implement the specified layout requirements to create a common user interface layout that may accommodate the selected target languages without requiring the program developer to implement many, if any, manual edits to the user interface layout. The Multi-Language User Interface Layout Optimizing Program 108A, 108B (FIG. 1) may present the program developer with a drop-down list of layout properties from which the program developer may choose. Additionally, the Multi-Language User Interface Layout Optimizing Program 108A, 108B (FIG. 1) may store the layout properties in a user configurable file on the client computer 102 (FIG. 1) or the server 112 (FIG. 1). The layout properties may be edited. For example, a program developer may wish to create a new layout property or delete an existing layout property. The program developer may accomplish the desired edit to the layout properties by altering the user configurable file.

Following next at 208, the present embodiment may perform a pseudo-translation of the selected user interface layout pages to expand the text of the first language for each of the specified target languages. The Multi-Language User Interface Layout Optimizing Program 108A, 108B (FIG. 1) may generate a pseudo-translated user interface layout page within the IDE 114 (FIG. 1) for each of the group of pseudo-translated target languages. Each pseudo-translated user interface layout page may display a different pseudo-translated target language. Furthermore, pseudo-translation may expand each of the strings of text by a language-specific factor (e.g. expansion factor) for each of the specified target languages. The expansion factor may increase the text in the first language by a specified percentage or amount for each particular target language so the pseudo-translated text is approximately the length of the same text in the target language. For example, if a user wishes to perform a pseudo-translation from an English first language to a German target language, an expansion factor of 30% may be implemented since German text may be 30% longer than presented English text. Therefore, 30% more space for characters may be added to the English text to achieve an approximate length of the German text without performing an actual translation of the text from English to German, which may be costly, time-consuming, and otherwise infeasible during the current stage of development.

Next at 210, a merge algorithm may be applied according to the specified layout requirements so that each selected target language may be portrayed using the same layout. After conducting a pseudo-translation of the selected user interface layout pages from the first language into each of the selected target languages, the layout for each pseudo-translated target language may be portrayed incorrectly. These layout issues may be automatically (e.g. in real-time) corrected by the implementation of the specified layout requirements via the merge algorithm to the pseudo-translated user interface layout pages. According to the present embodiment, the merge algorithm may be an algorithm used by the Multi-Language User Interface Layout Optimizing Program 108A, 108B (FIG. 1) to apply each of the specified layout requirements to the pseudo-translated user interface layout pages so that the program developer may portray the completed layout in each of the selected target languages without the presence of format or styling issues. A merge algorithm may deal with modern web components and images, not just legacy controls, and may minimize the maintenance burden by achieving as few layout property sets as possible that meet the layout requirements, such as aligning with an adjacent image; disallowing text wrapping for certain languages; providing spare space for at least N characters of text of a certain font size; and, for emphasis on a subset of text, such as one or more highlighted numbers, using a font size bigger than the surrounding text.

Furthermore, the present embodiment may begin by applying the merge algorithm to the selected target language with the largest pseudo-translation expansion factor. For example, the German language may contain words with longer symbols than the Spanish language. Therefore, the present embodiment may begin making modifications to the pseudo-translated user interface layout page for the German language before making modifications to the pseudo-translated user interface layout page for the Spanish language, since changes made to the pseudo-translated user interface layout page for the German language may accommodate the pseudo-translation for the Spanish language.

The Multi-Language User Interface Layout Optimizing Program 108A, 108B (FIG. 1) may apply the specified layout requirements to the pseudo-translated user interface layout pages in a hierarchy of the most shared (e.g. most generic) specified layout requirements among the selected target languages to the least shared (e.g. most language-specific) layout properties among the selected target languages. For example, if there are eight target languages, the present embodiment may begin by implementing the merge algorithm for a layout property that applies to all eight target languages, such as preventing all truncation and concatenation. The present embodiment may next apply a layout property that applies to three target languages, such as disallowing vertical text wrapping for Asian languages. Additionally, the present embodiment may continue on and apply a layout property that applies to only one target language, such as using a larger font for the Korean language. If a particular layout property is not supported by one of the target languages, the merge algorithm may not apply that layout property to the pseudo-translated user interface layout page.

Additionally, the Multi-Language User Interface Layout Optimizing Program 108A, 108B (FIG. 1) may create a single layout to accommodate the specified layout requirements for all selected target languages. For example, the English, French, German, and Spanish languages may possess enough common characteristics that each may be presented in the same layout while still adhering to the specified layout requirements. However, according to at least one implementation of the present embodiment, more than one layout may be created to accommodate the selected target languages that are not able to satisfy all of the specified layout requirements. For example, Asian languages may disallow some text, such as multiple characters representing a single word, to be wrapped vertically, whereas most text in a Western language may be wrapped vertically. Therefore, if a pseudo-translated page includes text within a table, two alternative layout fragments related to wrapping may need to be applied so that both Asian languages and the Western languages can accommodate the same table.

Next at 212, it may be determined whether the method has properly modified all text and images in order to properly fit on the selected pages for each pseudo-translated target language. According to one implementation, the method may continue along the operational flowchart 200, if all text and images have been properly modified according to the specified layout requirements. If it is determined that the method should continue along the operational flowchart 200, then the method advances to step 216. If it is determined that the method should not advance to step 216, then the method may continue to step 214 to allow the user to manually edit the pseudo-translated target language layouts.

Next at 214, if the method is unable to apply the specified layout requirements to the pseudo-translated user interface layout pages properly, the program developer may be prompted to examine and manually edit the pseudo-translated user interface layout pages. After the present embodiment implements the merge algorithm to apply the specified layout requirements to the pseudo-translated user interface layout pages, errors may remain and adjustments to the modified pseudo-translated user interface layout pages may be necessary. However, when a specified layout requirement is not able to be automatically applied, the program developer may be prompted with a number of editing options to select from to assist in applying the specified layout requirements. As such, the user may be able to select which of several suggested rules will be applied based on the IDE recommendations or may be able to choose to let the IDE apply the most promising rule(s) for the layout issues at hand. For example, if all radio boxes are not able to properly fit with sufficient space along the left side of associated help text, program developer may be prompted with options to reposition the associated help text on top of the radio boxes, thereby freeing up additional space on the right of the radio boxes.

According to another implementation, the Multi-Language User Interface Layout Optimizing Program 108A, 108B (FIG. 1) may enter into a manual edit mode and modifications to the pseudo-translated user interface layout page may be implemented via a mouse or touchpad or by automatic resizing to avoid text truncation.

Then at 216, a reverse pseudo-translation may be implemented to restore the text back to the first language resource text and retain any modifications. As previously described, reverse pseudo-translation is an automated process used to return artificially expanded, pseudo-translated user interface layout page to the first language in which the layout was originally presented. For example, if a layout originally prepared in the English language is pseudo-translated into the German language in order to apply the merge algorithm, the translation from the pseudo-translated German language back to the English language constitutes a reverse pseudo-translation. The reverse pseudo-translation may be conducted while preserving the modified format and style applied to the pseudo-translated user interface layout page by the merge algorithm or the manual edits performed by the user. Then, the reverse pseudo-translated layout may be saved to the computer 102 (FIG. 1) or the server 112 (FIG. 1).

It may be appreciated that FIG. 2 provides only an illustration of one implementation and does not imply any limitations with regard to how different embodiments may be implemented. Many modifications to the depicted environments may be made based on design and implementation requirements. For example, as previously described, the present embodiment may be implemented in hardware via a graphics display adapter to apply to either a subset or complete screen coverage and may be made software selectable as needed.

Referring now to FIG. 3, an example 300 of the optimization of a multi-language user interface layout via reverse pseudo-translation is presented. Specifically, this example involves the design of a button 304 to be included in a software program layout being designed in the English language. According to the present embodiment, the program developer may first designate a user interface layout page 302 in the first language to be pseudo-translated. Next, the present embodiment may have the program developer select target languages into which the present embodiment may pseudo-translate the selected first language user interface layout page 302. For example, the program developer may designate German as the language to pseudo-translate the first language user interface layout page 302 into, since the program developer may want the completed software program layout to be translated into German. Furthermore, the program developer may specify layout requirements that the completed software program layout may possess. For example, the program developer may desire that button 304 possess a minimum width. In the CSS layout displayed in 302, the button 304 has a width of 10% of the containing block according to the third line of text. Next, the first language user interface layout page 302 may be pseudo-translated into the target language (i.e. German). The pseudo-translated user interface layout page 306 may expand the first language text by an expansion factor as previously described. Additionally, the pseudo-translated user interface layout page 306 may display the button 308 improperly according to the specified layout requirements. Thereafter, the present embodiment may apply the merge algorithm so a modified pseudo-translated user interface layout page 310 and the button 312 may conform to the specified layout requirements. Next, if the merge algorithm cannot properly apply all of the specified layout requirements, the Multi-Language User Interface Layout Optimizing Program 108A, 108B (FIG. 1) may enter a manual edit mode and prompt the program developer to make further modifications to the modified pseudo-translated page of text 310. Thereafter, the present embodiment may perform a reverse pseudo-translation back to the first language, which may produce a modified first language user interface layout page 314, while maintaining the modifications implemented by the merge algorithm and any manual user edits. The modified first language user interface layout page 314 may allow the completed software program to display the button 316 both in the English language and the German language without any styling or format issues while retaining the same layout. Furthermore, taking into account the expansion factor, the merge algorithm may, depending on any additional layout requirements, preserve or change slightly the original width of button 304 to avoid a waste of free space, while preserving common layout properties across all languages.

Figure 4:
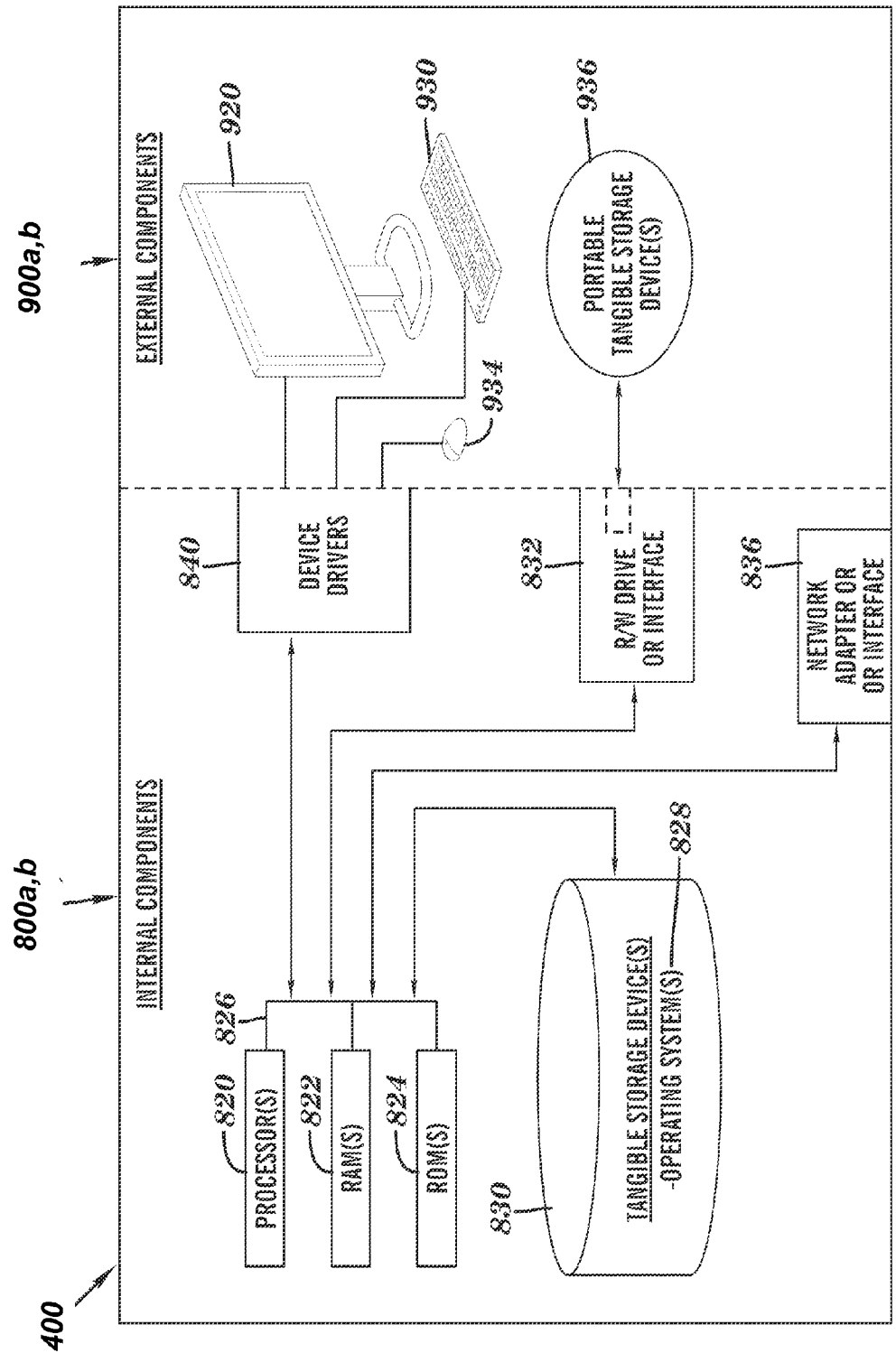
FIG. 4 is a block diagram of internal and external components of computers and servers depicted in FIG. 1 according to at least one embodiment.

FIG. 4 is a block diagram 400 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, tablet, or other electronic devices. Examples of computing systems, environments, and/or configurations that may be represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) may include respective sets of internal components 800 a, b and external components 900 a, b illustrated in FIG. 4. Each of the sets of internal components 800 a, b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and the Multi-Language User Interface Layout Optimizing Program 108A (FIG. 1) in client computer 102 (FIG. 1) and Multi-Language User Interface Layout Optimizing Program 108B (FIG. 1) in network server computer 112 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 a, b, also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as Multi-Language User Interface Layout Optimizing Program 108A (FIG. 1) and 108B (FIG. 1), can be stored on one or more of the respective portable computer-readable tangible storage devices 936, read via the respective R/W drive or interface 832 and loaded into the respective hard drive 830.

Each set of internal components 800 a, b also includes network adapters or interfaces 836 such as a TCP/IP adapter cards, wireless Wi-Fi interface cards, or 3G or 4G wireless interface cards or other wired or wireless communication links. The Multi-Language User Interface Layout Optimizing Program 108A (FIG. 1) in client computer 102 (FIG. 1) and Multi-Language User Interface Layout Optimizing Program 108B (FIG. 1) in network server 112 (FIG. 1) can be downloaded to client computer 102 (FIG. 1) from an external computer via a network (for example, the Internet, a local area network or other, wide area network) and respective network adapters or interfaces 836. From the network adapters or interfaces 836, the Multi-Language User Interface Layout Optimizing Program 108A (FIG. 1) in client computer 102 (FIG. 1) and the Multi-Language User Interface Layout Optimizing Program 108B (FIG. 1) in network server computer 112 (FIG. 1) are loaded into the respective hard drive 830. The network may comprise copper wires, optical fibers, wireless transmission, routers, firewalls, switches, gateway computers and/or edge servers.

Each of the sets of external components 900 a, b can include a computer display monitor 920, a keyboard 930, and a computer mouse 934. External components 900 a, b can also include touch screens, virtual keyboards, touch pads, pointing devices, and other human interface devices. Each of the sets of internal components 800 a, b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the one or more embodiment, the practical application or technical improvement over technologies found in the marketplace, or to enable others of ordinary skill in the art to understand the embodiments disclosed herein.

What is claimed is:

1. A method for optimizing a multi-language user interface layout via reverse pseudo-translation, the method comprising:
   selecting at least one user interface page from a group of user interface pages in a language;
   selecting at least one target language from a group of target languages to pseudo-translate the at least one user interface page;
   specifying at least one layout requirement for formatting the selected at least one user interface page;
   performing pseudo-translation of the at least one user interface page based on the selected at least one target language;
   modifying, by a merge algorithm, the at least one pseudo-translated user interface page according to the at least one specified layout requirement, wherein the merge algorithm comprises:
      applying the at least one specified layout requirement to the at least one pseudo-translated user interface page, wherein the at least one specified layout requirement is applied to the at least one pseudo-translated user interface page in a hierarchy from a most shared selected layout property among the at least one selected target language to a least shared selected layout property among the at least one selected target language; and
   implementing a reverse pseudo-translation of the at least one modified pseudo-translated user interface page.

2. The method of claim 1 further comprising:
   examining the at least one modified pseudo-translated user interface page for nonconformity with the at least one specified layout requirement; and
   editing, the at least one modified pseudo-translated user interface page.

3. The method of claim 1, further comprising:
   implementing a mark-up language for creating the group of user interface pages, wherein the implemented mark up language is selected from a group consisting of at least one of a cascading style sheet (CSS), a HyperText Markup Language (HTML), an Extensible Markup Language (XML), and a Windows resource definition format (RC/RESX).

4. The method of claim 1, further comprising:
   creating an integrated development environment, wherein the integrated development environment is created by a developer for at least one of the selection of the at least one user interface page; the selection of the at least one target language; and the specification of the at least one layout requirement.

5. The method of claim 1, further comprising:
   creating a single layout design for the at least one selected user interface page, wherein the single layout design will accommodate the translation of the at least one selected user interface page into each of the at least one selected target languages.

6. The method of claim 1, wherein the at least one specified layout requirement comprises a prevention of at least one of a truncation; a mis-alignment of a component; a mis-alignment of a text relative to an associated image; a text-wrapping constraint; a larger font size for a designated emphasized text; and a configurable white space to text ratio.

7. A computer system for optimizing a multi-language user interface layout via reverse pseudo-translation, the computer system comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   selecting at least one user interface page from a group of user interface pages in a first language;
   selecting at least one target language from a group of target languages to pseudo-translate the at least one user interface page;
   specifying at least one layout requirement for formatting the selected at least one user interface page;
   performing pseudo-translation of the at least one user interface page based on the selected at least one target language;
   modifying, by a merge algorithm, the at least one pseudo-translated user interface page according to the at least one specified layout requirement, wherein the merge algorithm comprises:
      applying the at least one specified layout requirement to the at least one pseudo-translated user interface page, wherein the at least one specified layout requirement is applied to the at least one pseudo-translated user interface page in a hierarchy from a most shared selected layout property among the at least one selected target language to a least shared selected layout property among the at least one selected target language; and
   implementing a reverse pseudo-translation of the at least one modified pseudo-translated user interface page.

8. The computer system of claim 7 further comprising:
   examining the at least one modified pseudo-translated user interface page for nonconformity with the at least one specified layout requirement; and
   editing, the at least one modified pseudo-translated user interface page.

9. The computer system of claim 7, further comprising:
   implementing a mark-up language for creating the group of user interface pages, wherein the implemented mark up language is selected from a group consisting of at least one of a cascading style sheet (CSS), a HyperText Markup Language (HTML), an Extensible Markup Language (XML), and a Windows resource definition format (RC/RESX).

10. The computer system of claim 7, further comprising:
creating an integrated development environment, wherein the integrated development environment is created by a developer for at least one of the selection of the at least one user interface page; the selection of the at least one target language; and the specification of the at least one layout requirement.

11. The computer system of claim 7, further comprising:
creating a single layout design for the at least one selected user interface page, wherein the single layout design will accommodate the translation of the at least one selected user interface page into each of the at least one selected target languages.

12. The computer system of claim 7, wherein the at least one specified layout requirement comprises a prevention of at least one of a truncation; a mis-alignment of a component; a mis-alignment of a text relative to an associated image; a text-wrapping constraint; a larger font size for a designated emphasized text; and a configurable white space to text ratio.

13. A computer program product for optimizing a multi-language user interface layout via reverse pseudo-translation, the computer program product comprising:
one or more non-transitory computer-readable tangible storage medium and program instructions stored on at least one of the one or more non-transitory tangible storage medium, the program instructions executable by a processor, the program instructions comprising:
program instructions to select at least one user interface page from a group of user interface pages in a language;
program instructions to select at least one target language from a group of target languages to pseudo-translate the at least one user interface page;
program instructions to specify at least one layout requirement for formatting the selected at least one user interface page;
program instructions to perform pseudo-translation of the at least one user interface page based on the selected at least one target language;
program instructions to modify, by a merge algorithm, the at least one pseudo-translated user interface page according to the at least one specified layout requirement, wherein the merge algorithm comprises:
applying the at least one specified layout requirement to the at least one pseudo-translated user interface page, wherein the at least one specified layout requirement is applied to the at least one pseudo-translated user interface page in a hierarchy from a most shared selected layout property among the at least one selected target language to a least shared selected layout property among the at least one selected target language; and
program instructions to implement a reverse pseudo-translation of the at least one modified pseudo-translated user interface page.

14. The computer program product of claim 13 further comprising:
program instructions to examine the at least one modified pseudo-translated user interface page for nonconformity with the at least one specified layout requirement; and
program instructions to edit, the at least one modified pseudo-translated user interface page.

15. The computer program product of claim 13, further comprising:
program instructions to implement a mark-up language for creating the group of user interface pages, wherein the implemented mark up language is selected from a group consisting of at least one of a cascading style sheet (CSS), a HyperText Markup Language (HTML), an Extensible Markup Language (XML), and a Windows resource definition format (RC/RESX).

16. The computer program product of claim 13, further comprising:
program instructions to create an integrated development environment, wherein the integrated development environment is created by a developer for at least one of the selection of the at least one user interface page; the selection of the at least one target language; and the specification of the at least one layout requirement.

17. The computer program product of claim 13, further comprising:
program instructions to create a single layout design for the at least one selected user interface page, wherein the single layout design will accommodate the translation of the at least one selected user interface page into each of the at least one selected target languages.

* * * * *